Figure 1:
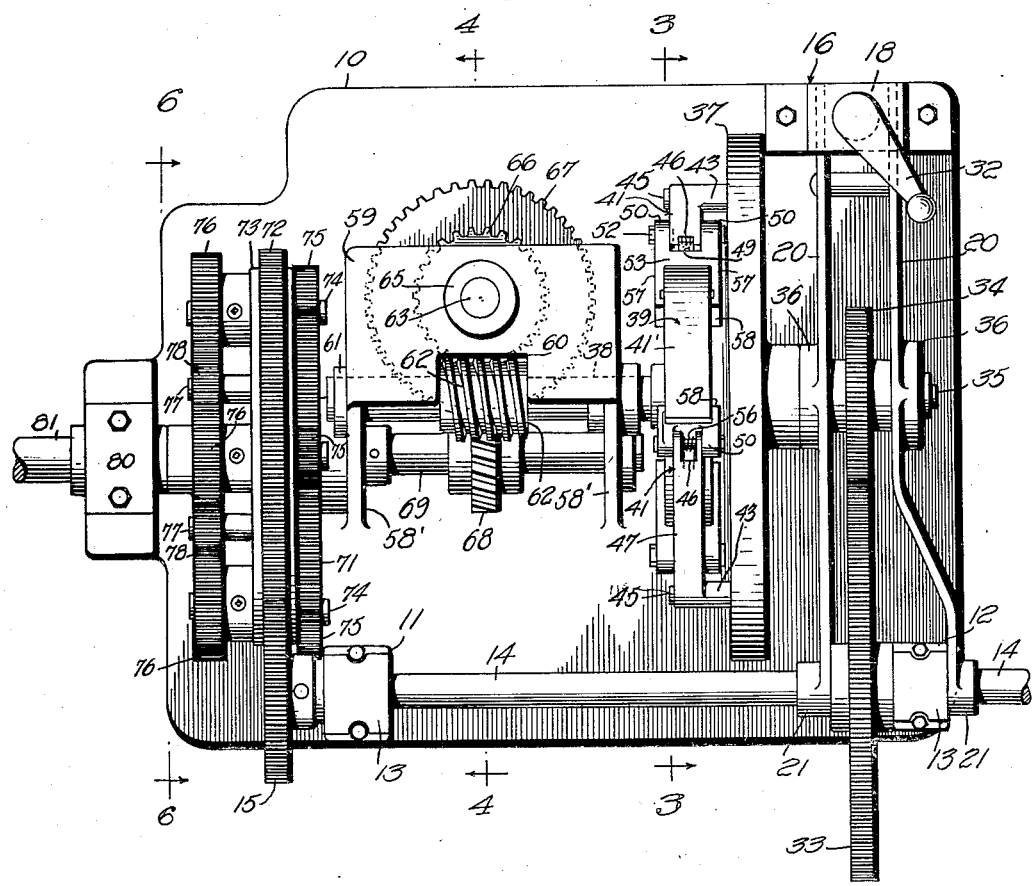

Nov. 6, 1934.    F. W. ARMITAGE ET AL    1,979,723
VARIABLE SPEED TRANSMISSION
Filed April 20, 1931    3 Sheets-Sheet 1

Inventor
FREDERICK W. ARMITAGE
EDWARD G. ARCHER
By
C. L. Parker Jr.
Attorney

Nov. 6, 1934.  F. W. ARMITAGE ET AL  1,979,723
VARIABLE SPEED TRANSMISSION
Filed April 20, 1931  3 Sheets-Sheet 2

Inventor
FREDERICK W. ARMITAGE
EDWARD G. ARCHER
By C. L. Parker Jr.
Attorney

Nov. 6, 1934.   F. W. ARMITAGE ET AL   1,979,723
VARIABLE SPEED TRANSMISSION
Filed April 20, 1931   3 Sheets-Sheet 3
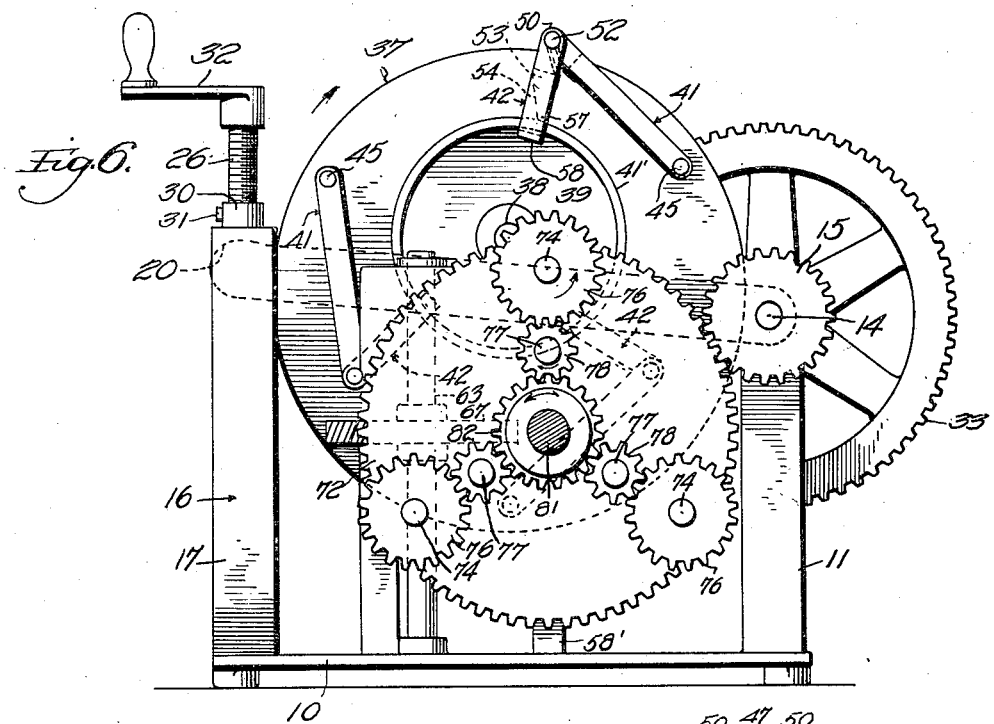
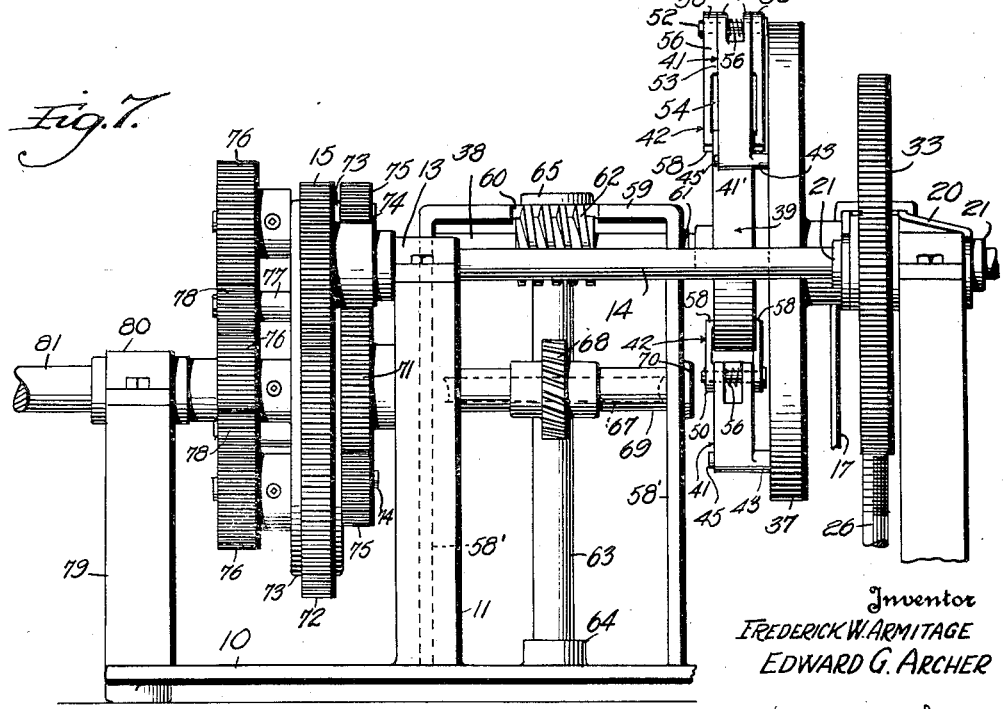
Inventor
FREDERICK W. ARMITAGE
EDWARD G. ARCHER
By C. L. Parker Jr.
Attorney Patented Nov. 6, 1934

1,979,723

UNITED STATES PATENT OFFICE 1,979,723

VARIABLE SPEED TRANSMISSION

Frederick W. Armitage and Edward G. Archer, Hopewell, Va., assignors, by mesne assignments, to Tom A. Burford, Hopewell, Va.

Application April 20, 1931, Serial No. 531,552

1 Claim. (Cl. 74—112)

This invention relates to variable speed transmissions and is an improvement over our prior Patent No. 1,791,698, granted February 10, 1931.

In our prior patent referred to, we have disclosed a novel variable speed transmission which is adapted to a wide variety of uses, but which was particularly adapted for use in connection with the manufacture of artificial silk wherein variable speed drive means is required for rotating the spools or drums upon which the filaments are wound.

The apparatus referred to is adapted for converting uni-directional constant speed rotation into a speed varying indefinitely from the speed of the prime mover to zero and/or from zero speed to the speed of the prime mover in the opposite direction. To accomplish the desired results, the device moves in accordance with an established law of relative motion. For example, if two disks, wheels or other similar members are rotated in adjacent parallel planes at the same speed and in the same direction, with their centers of rotation coinciding, all parts of the disks will maintain the same relative positions during continued rotation of the elements referred to. However, if the axes of rotation are moved laterally with respect to each other, with the disks running at the same speed and in the same direction, any point of either disk will describe with respect to the other disk a circle having a radius equal to the distance apart of the axes of rotation of the disks.

Accordingly in the apparatus of our prior patent, two adjacent rotatable members are provided, one constituting a driving element and the other a driven element, and power transmission means is provided between the rotatable members for utilizing the relative rotation of given points on the driving member with respect to the driven member whereby variable rotational speeds are transmitted from the driving member to the driven member. The apparatus was found to be fully practicable, but the present application has been evolved as an improvement thereover, and utilizes the same general principles involved in the transmission of power between the driving and driven members.

An important object of the present invention is to improve and simplify the power transmission means between the driving and driven elements.

A further object is to provide an apparatus of the character referred to wherein the gear of the driven member and the sets of pinions utilized for transmitting power thereto from the driving member have been eliminated, thus effecting a saving in manufacturing costs and rendering the apparatus much quieter in operation.

A further object is to utilize simple and positive means for taking advantage of components of the relative rotation of given points on the driving member for effecting rotation of the driven member without noise, and without any lost motion, whereby the driven member may be caused to rotate at variable speeds while the driving member is driven at a constant rotational speed.

Other objects and advantages of the invention will become apparent during the course of the following description.

Figure 2:
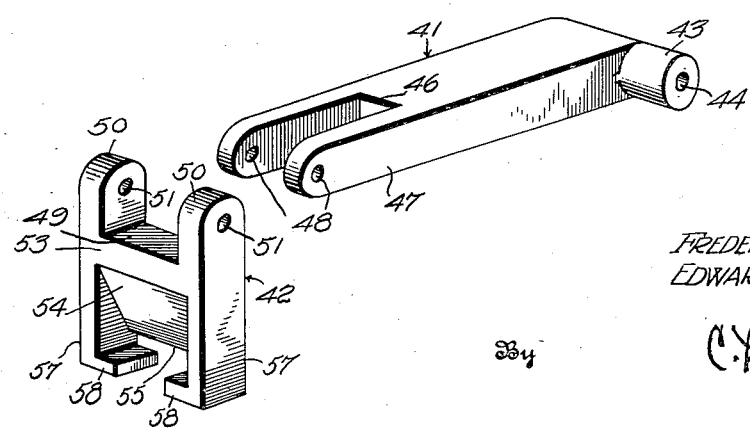
Figure 3:
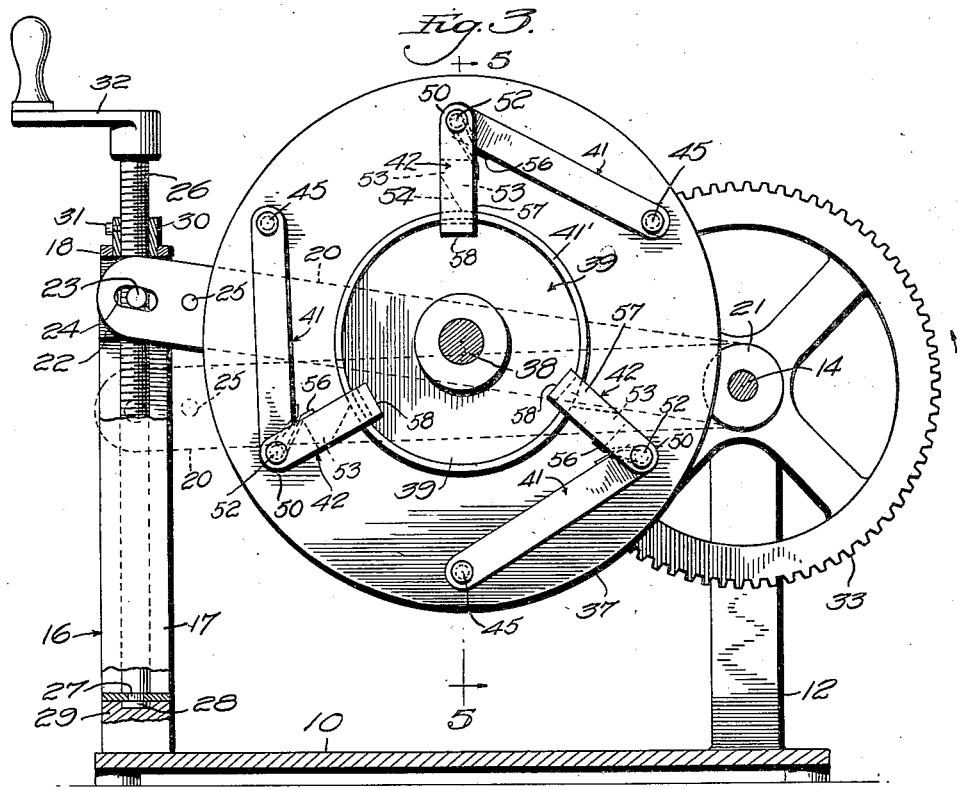
Figure 4:
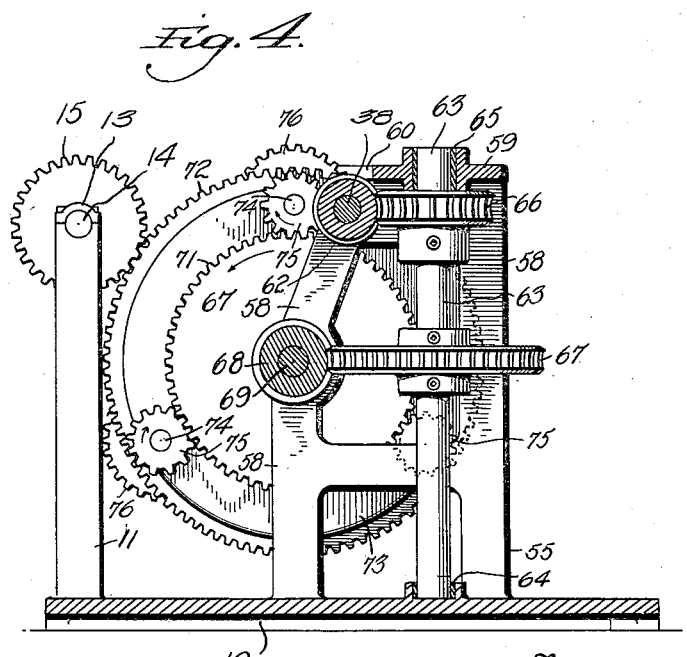
Figure 5:
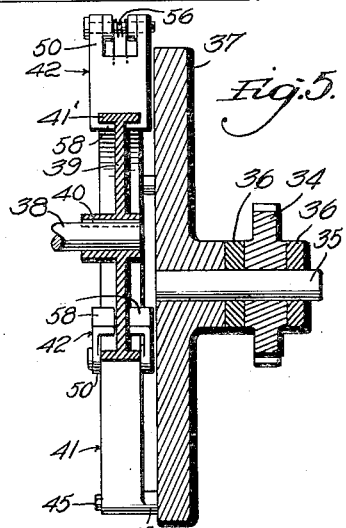

In the drawings we have shown one embodiment of the invention. In this showing,

Figure 1 is a plan view,

Figure 2 is a detail perspective view of the two main elements of one of the power transmitting devices between the driving and driven elements, the parts being shown separated, Figure 3 is a section on line 3—3 of Figure 1, Figure 4 is a similar view on line 4—4 of Figure 1, Figure 5 is a detail section on line 5—5 of Figure 3, Figure 6 is a section on line 6—6 of Figure 1, and, Figure 7 is a side elevation.

The embodiment of the invention illustrated in the drawings provides a power take-off shaft the rotational speed of which is adapted to be varied from a given maximum to a given minimum speed throughout the range of variation at which the power take-off shaft rotates, in the same direction. As will become apparent, however, the apparatus may be varied to permit the power take-off shaft to vary from a given maximum speed to zero speed, or wherein the shaft may be made to rotate in the opposite direction.

Referring to the drawings, the numeral 10 designates a suitable base or support adjacent one side of which is mounted a pair of vertical standards 11 and 12 carrying bearings 13 at their upper ends. A shaft 14 is mounted to rotate in the bearings 13 and is provided adjacent the standard 11 with a driving pinion 15 for a purpose to be described. The opposite end of the shaft 14 is connected to any desired prime mover to be driven thereby at a constant speed. At the side of the base opposite the standard 12 there is arranged a vertical standard 16 including spaced parallel side members 17 connected at their upper ends by a cross member 18.

A pair of arms 20 is provided at one end with bearings 21 rotatably receiving the shaft 14, one of the bearings being arranged adjacent the outer face of the bearing 13 while the other bearing 21 is arranged at a point spaced from the opposite side of the bearing 13. The free ends of the arms 20 project between the arms 17 of the standard 16 and are provided therebetween with a bearing block 22. The bearing block 22 is provided with opposite trunnions 23 extending beyond the bearing block and slidable in slots 24 extending longitudinally of the arms 20. The end portions of the arms 20 adjacent the bearing block are spaced from each other by a rigid pin 25.

A threaded stem 26 projects vertically through the standard 16 and is provided adjacent its lower end with a reduced neck 27 and an enlarged head 28 rotatable in a bearing block 29 to prevent vertical movement of the screw stem 26. A collar 30 may surround the stem 26 where the latter projects through the cross member 18, and the collar may be secured to the stem 26 by a set screw 31. The upper end of the stem 26 is provided with an operating crank 32.

A gear 33 is keyed or otherwise secured to the shaft 14 and meshes with a preferably smaller gear 34 secured to a shaft 35 rotatable in bearings 36 carried by the arms 20. Accordingly it will be apparent that rotation of the shaft 14 by the prime mover rotates the shaft 35 through the medium of the gears 33 and 34.

A rotatable driving member 37 is secured to the shaft 35 as clearly shown in Figures 1 and 5. Means associated with the driving member 37 are adapted to transmit a rotary motion to a shaft 38 in a manner to be described, and the proportionate speeds of rotation of the shafts 35 and 38 will depend upon the arrangement of the axis of these elements with respect to each other, as will become apparent.

Referring to Figures 1, 5, 6 and 7, the numeral 39 designates a rotatable member keyed as at 40 to the shaft 38 to rotate therewith. In the present instance, the rotatable member 39 is illustrated as being in the form of a disk having outstanding annular flanges 41' at its periphery for a purpose to be described.

A series of power transmitting elements is employed for transmitting rotation of the driving member 37 to the driven member 39, and each of the transmitting elements includes two preferably cast members designated by the numerals 41 and 42, and illustrated in detail in Figure 2 of the drawings. Each member 41 is in the form of an arm having a laterally projecting boss 43 at one end, and this boss and the main body of the arm are drilled to provide a bearing opening 44. The driving member or disk 37 is provided with a plurality of circumferentially spaced pins 45 each of which projects through the opening 44 of one of the arms 41. The other end of each arm 44 is bifurcated as at 46 to provide arms 47 having alined openings 48 therethrough.

The member 42 of each power transmitting device is bifurcated at one end as at 49 to provide arms 50 having alined openings 51 therethrough. The arms 47 extend between and fit within the arms 50, and a pivot pin 52 connects the two arms together. Intermediate its ends, each member 42 includes a transverse central body portion 53, the inner portion of which is provided with a tapered face 54 whereby the transverse member terminates in an inner relatively narrow edge 55 for a purpose to be described. A coil spring 56 surrounds each pivot pin 52, and the ends of this spring contact respectively with the body of the member 41 and one face of the transverse member 53, as shown in Figures 3 and 6.

Each power transmitting member 42 also has spaced arms 57 at its inner end, and the ends of these arms are provided with inturned flanges 58, as clearly shown in Figures 2 and 5. The flanges or fingers 58 and the edge 55 define a space to receive the flange 41' of the driven member 39, as shown in Figure 5.

A supporting structure including vertical arms 58' is carried by the base 10, and the upper ends of the arms 58' are connected by a cross member 59, notched centrally of one edge thereof as at 60. The arms 58' carry bearings 61 rotatably supporting the shaft 38, and the latter is provided intermediate the arms 58' with a worm 62. This worm may be arranged in the notch 60 as shown in Figures 1 and 7.

A vertical shaft 63 is journalled at its lower end in a bearing 64 carried by the base 10, and at its upper end in a bearing 65 carried by the cross member 59. A worm wheel 66 is carried by the shaft 63 and meshes with the worm 62 to be driven thereby. The shaft 63 also carries a helical gear 67 meshing with a helical pinion 68 carried by a counter shaft 69, and this shaft is journalled in bearings 70 carried by the supports 58'.

The shaft 14 is positively driven, while the shaft 69 is driven at variable speeds according to the desired final speed of rotation, and the proportionate speeds of the shafts referred to are utilized through a compound epicyclic train to drive a power take-off shaft. Referring to Figures 1, 4 and 7, the numeral 71 designates a gear connected to the shaft 69 to be driven thereby. A master gear 72 is arranged adjacent and parallel to the gear 71, and the axes of these two gears coincide. The pinion 15, carried by the shaft 14, meshes with the master gear 72 whereby it will be apparent that the latter is driven at a constant speed.

The master gear 72 is formed on the outer edge of a master driving disk 73 in which is journalled a plurality of shafts 74 having their axes arranged circularly concentric to the axis of the gear 72. Each shaft 74 carries a planetary pinion 75 meshing with the gear 71, as shown in Figure 4, while the outer ends of the shafts 74 carry larger pinions 76. Inwardly of the shafts 74, a second set of stub shafts 77 is carried by the driving disk 73, the axes of the shafts 77 also lying in a circle concentric to the axis of the master gear 72. Small pinions 78 are carried by the shafts 77 and mesh with the respective pinions 76.

Referring to Figures 1 and 7, the numeral 79 designates a standard carried by the base 10 and provided at its upper end with a bearing 80 rotatably supporting a shaft 81. This shaft constitutes the power take-off shaft of the embodiment of the mechanism illustrated, and the take-off shaft is provided at its inner end with a gear 82 meshing with the intermediate pinions 78, as shown in Figure 6.

The operation of the apparatus is as follows:

The shaft 14 is connected to a prime mover to be driven thereby at a constant speed, while the operating crank 32 is rotated to cause the power take-off shaft 81 to rotate at variable speeds as may be desired according to the form of the device being driven thereby. Rotation of the power input shaft 14 obviously effects positive rotation of the gears 34 and 72 through their driving gears 33 and 15 respectively.

The driving disk 37 is carried by the shaft 35 to be rotated thereby at a constant speed, and accordingly it will be apparent that the pins or posts 45 are caused to travel with the disk 37, carrying with them the arms 41 of the power transmitting devices. The pulling action exerted upon the arms 41, as the driving disk rotates in the direction of the arrow illustrated in Figure 6 is transmitted to the driving disk 39 through the members 42. It will be apparent that the members 42 are adapted to slide circumferentially with respect to the driving disk 39 under some conditions, due to the arrangement of the flange 41 between the fingers 58 and the edge 55 of each driving member 42, but this sliding movement is dependent upon the positions of the elements of each transmitting device with respect to each other and with respect to the driven member 39.

The operating crank 32 may be rotated to cause vertical movement of the bearing block 22, and this vertical movement will be transmitted to the free ends of the arms 20. These arms swing about the axis of the shaft 14 and rotatably support the gear 34, driving disk 37, and the elements previously described associated therewith. The arms 20 may be considered to be in the normal position when arranged as shown in Figure 3, the axis of the shafts 35 and 38 coinciding with each other.

Under the conditions referred to, the elements of each transmitting device will occupy the same positions with respect to each other as the elements of the other transmitting devices, the angles between the arms 41 and 42 of all of the transmitting devices being the same. Accordingly rotation of the driving member 37 tends to cause all of the transmitting devices to move at a greater rotational speed than the driven disk 39, and accordingly the angles between the arms 41 and 42 increase whereby the flange 41' of the driven member will be gripped between the fingers 58 and edge 55 of each of the arms 42. Accordingly the driving member 37, the driven member 39, and the transmitting elements between these members will rotate as a unit at the same speed.

When the member 39 is driven in the manner just described, its rotation is imparted to the shaft 38 to rotate the worm 62, and rotation of the worm is transmitted to the worm wheel 66 to drive the vertical shaft 63. This action in turn is transmitted to the helical gear 67 and thence to the helical pinion 68 which drives the shaft 69. Rotation of the latter shaft obviously causes rotation of the variable driving gear 71.

The provision of the various gearing elements for driving the respective gears 71 and 72 is such that when the shafts 35 and 38 are arranged in axial alinement, the gears 71 and 72 will be driven at the same speed. The gearing referred to, however, constitutes only one embodiment of the invention, and it will be apparent that under the conditions referred to with respect to the shafts 35 and 38, the gears 71 and 72 may be made to rotate with respect to each other. The invention however, is being particularly described with respect to the specific embodiment thereof illustrated in the drawings.

Assuming the gears 71 and 72 to be rotating at equal speeds under the conditions stated, it will be apparent that the stub shafts 74 will travel with the wheel 72 about the axes thereof, and the rotative speeds of the shafts 74 about the axis of the gear 72 corresponds to the rotative speed of the gear 71. Accordingly there will be no rotation of the pinions 75 about their own axes, and it necessarily follows that the same thing is true in connection with the outer pinions 76 which are connected to the pinions 75.

Since, under the conditions stated, the pinions 76 are fixed against rotation about their own axes, it follows, of course, that the intermediate pinions 78 also are prevented from rotating about their own axes since these pinions are constantly in mesh with the pinions 76. Accordingly the shafts 74 and 77 rotate about the axis of the gear 72 at a rotative speed exactly equal to that of the latter gear. The gear 82 is secured to the shaft 81 to drive the latter, and its rotation is governed by the pinions 78. Since under the conditions referred to, the pinions 78 are fixed against rotation about their own axes, it will be apparent that the pinion 82 will be caused to rotate at the same speed as the gear 72.

When it is desired to change the speed of rotation of the take-off shaft 81 as the power input shaft 14 continues to rotate at the same speed, it merely is necessary to rotate the operating crank 32 to offset the axes of the shafts 35 and 38 with respect to each other. In the embodiment of the invention illustrated, the operation of the crank 32 swings the arms 20 downwardly whereby the axis of the shaft 35 is moved downwardly below the axis of the shaft 38, under which conditions the speed of rotation of the shaft 81 will be decreased.

Under the conditions just referred to, the device operates in accordance with the established law of relative motion discussed above. With the centers of rotation of the shafts 35 and 38 moved apart, with the members 37 and 39 running at the same speed and in the same direction, any point on either member will describe with respect to the other member a circle having a radius equal to the distance apart of the centers of rotation of the disk. This theory is utilized in the present embodiment of the apparatus for rotating the driven member 39 at a greater rate of speed than the driving member 37. Assuming that the arms 20 have been moved downwardly by rotating the operating crank 32, the axis of the shaft 35 will occupy a position below the axis of the shaft 38, and under such conditions, it will be apparent that each of the driving pins 45 will describe a circle with respect to the driven member 39. One of the components of the circular movement of each pin 40 obviously will be, in a sense, a reciprocatory movement tangential with respect to the driven member 39.

With the axes of the shafts 35 and 38 offset in the manner referred to, it will be apparent that so long as the disk 37 rotates, the reciprocatory movement of each driving pin 40 referred to will continue, and the movement of each pin 40 in one direction during such reciprocatory movement is utilized for effecting rotation of the gear 39. Movement of each pin 40 in the opposite direction does not transmit any movement to the member 39, as will become apparent, and accordingly the parts associated with each post 40 operate in the nature of an overrunning clutch tending to transmit continuous rotary movement in one direction to the member 39. As distinguished from ordinary overrunning clutches, however, the present construction does not utilize pawls or ratchets or other similar elements which are subject to uneven movement, slippage, excess wear, etc.

Referring to Figure 3, it will be noted that each spring 56 tends to swing the corresponding arms 41 and 42 with respect to each other to increase the angularity between these elements. In other words, each arm 41 tends to swing in a clockwise direction with respect to its pivot pin 52, and thus the gripping edge 55, at one side of each arm 42, and the portions of the lips 58 adjacent the opposite side of the arm tend to swing into gripping engagement with the flange 41' of the driven member 39.

Due to the reciprocatory movement of each pin 45 with respect to the driven member 39, this movement in one direction obviously occurs with the pin rotating in the direction of the arrow in Figure 3 at a greater speed than the driven member 39 tends to move, and accordingly the corresponding spring 56 moves the arm 51 into gripping engagement with the flange 41' at such time and transmits a pulling movement thereto. At the same time, at least one of the other pins 45 will be moving in the opposite direction with respect to the driven member 39, and at such time, the positive motion transmitted to the member 39 will tend to swing the arm 41 of one of the latter transmitting devices against the tension of its spring 56, thus releasing the gripping engagement of the arm 42 on the flange 41'.

As each post 45 approaches its uppermost position, the gripping engagement will take place, while the grip will be released as the post 45 approaches its lower position. Accordingly it will be apparent that the gripping devices come into operation successively for rotating the driven member 29 at a higher rate of speed than the driving member 37. It also will be apparent that at least one of the gripping members will be in operation at all times.

The increased speed of the gear 39 obviously will be transmitted from the shaft 38 to the gear wheel 71 through the train of driving elements previously described. It will be apparent that the speed of rotation of the gear 72 is constant, and when the speed of rotation of the gear 71 is increased, this gear obviously travels at a greater rate of speed than the gear 72. Under such conditions, the shafts 74 will travel in a circle about the axis of the gear 72, while each pinion 75 will be caused to rotate about its own axis thus rotating the pinions 76 in the direction of the arrows indicated in Figures 4 and 6.

As previously stated, rotation of the gear 72 in the direction of the arrow indicated in Figure 6 transmits rotary motion in the same direction to the power take-off gear 82. However, when differential driving speeds are transmitted to the gears 71 and 72 to rotate the pinions 76 on their own axes in the manner described, such rotary motion is transmitted to the pinions 78 to cause relative rotating movement thereof in the direction of the arrow indicated in Figure 6. This rotation in turn is transmitted to the take-off gear 82, and thus this gear will be rotated relatively to the gear 72 in a direction opposite to is normal speed of rotation.

The reverse relative rotation of the gear 82 is of course, less than the speed of rotation of the gear 72, and hence the net speed of rotation of the gear 82 will be the difference between the rotation of the gear 72 and the relative reverse rotation of the gear 82. Accordingly the gear 82 will be caused to rotate at a speed slower than its normal speed, and the net speed referred to depends upon the distance to which the shafts 35 and 38 are offset from each other. Accordingly it will be apparent that any decreased speed of the power take-off shaft can be secured by increasing the distance between the shafts 35 and 38.

Three power transmitting units have been illustrated for transmitting power between the driving member 37 and driven member 39, but it will be apparent that any number of these units may be employed. In the use of the apparatus in connection with the textile industry, and particularly with reference to its use for winding artificial silk filaments on spools or the like it has been found that three units of the character referred to provide a sufficiently smooth and uniform transmission, but for other uses, it may be desired to increase the number of transmitting units.

It also will be apparent that the speed of the take-off shaft readily may be varied without stopping the operation of the machine, and as a matter of fact, changes may take place progressively while the apparatus is in operation. The power transmitting means between the driving and driven members are always in position ready to become operative, and accordingly motion is transmitted without the clashing, undue friction, or lost motion that occurs with the use of ratchets and similar devices. The use of the worm and worm wheel as a portion of the apparatus is preferred inasmuch as it operates as positive means for locking the variable speed members against slipping.

The present apparatus has been illustrated as one embodiment of the invention, but it will be apparent that the epicyclic gearing may be varied according to the particular uses to which the apparatus is to be put. For example, it is entirely possible to design and proportion the gears so that the speed of rotation of the power take-off shaft may be reduced to zero and then operated in a reverse direction. By the use of an epicyclic gear train it is possible to provide two driving gears one of which rotates at a constant speed and the other at a variable speed, and to utilize the equal or differential speeds of such gears to drive a power take off shaft at variable speeds.

It is to be understood that the form of our invention herewith shown and described is to be taken as a preferred example of the same and that various changes in the shapes, size and arrangement of parts may be resorted to without departing from the spirit of the invention or the scope of the subjoined claim.

We claim:

A variable speed transmission comprising a driving element and a driven element arranged adjacent each other in parallel relationship, bearing means for supporting each of said driving and driven elements, means for moving one of said bearing means transversely of its axis to vary the distance between the axes of said driving and driven elements, said driven member being provided with an annular member projecting outwardly from both sides thereof to form a circumferential guide, and a series of circumferentially spaced transmitting devices connected between said driving and driven elements, each transmitting device including an arm arranged approximately radially of said driven element and having a gripping device at one end receiving said circumferential guide and slidable therealong when the outer end of said arm is moved in one direction, said gripping device being movable into gripping engagement with said circumferential guide when the outer end of said arm is moved in the other direction, and a link pivotally connected at one end to the outer end of said arm and at its other end to said driving element whereby rotation of the latter is adapted to move said gripping device intermittently in the second named direction with respect to said driven element to transmit rotating movement thereto when the axes of said driving and driven elements are offset from each other, the pivotal connections between said links and said driving element lying on a circle of substantial size concentric with said driving element.

FREDERICK W. ARMITAGE.
EDWARD G. ARCHER.